April 2, 1963  C. H. HULTQUIST  3,083,518
TALL WEED LAWN MOWER ATTACHMENT
Filed Aug. 1, 1961  2 Sheets-Sheet 1
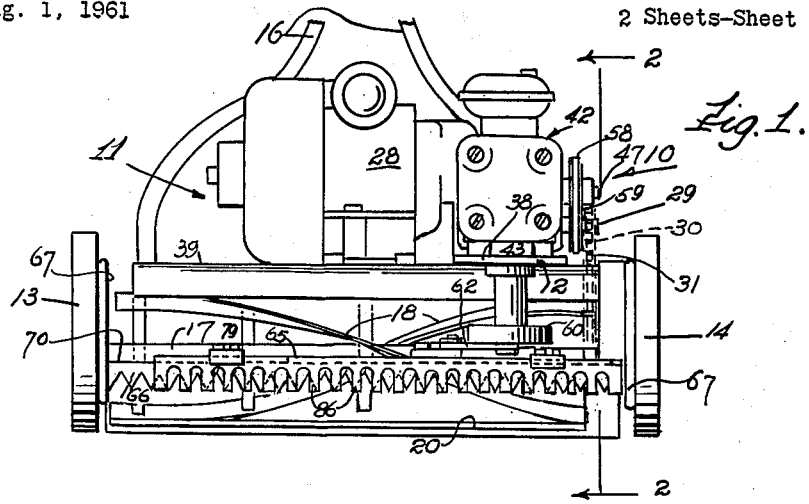
Fig. 1.
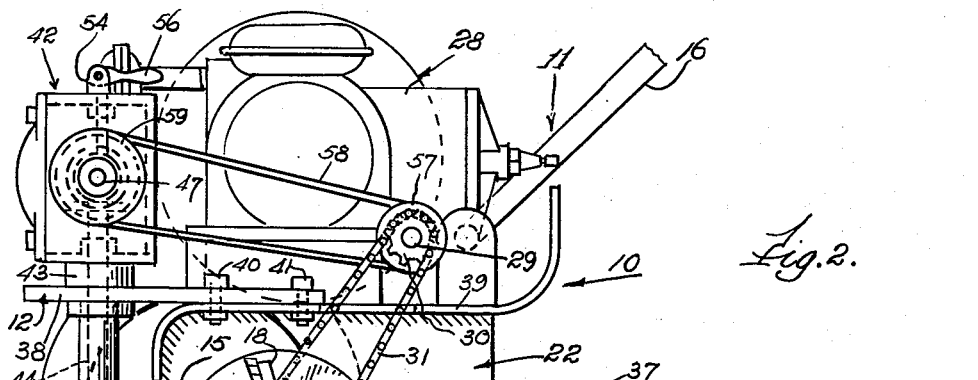
Fig. 2.
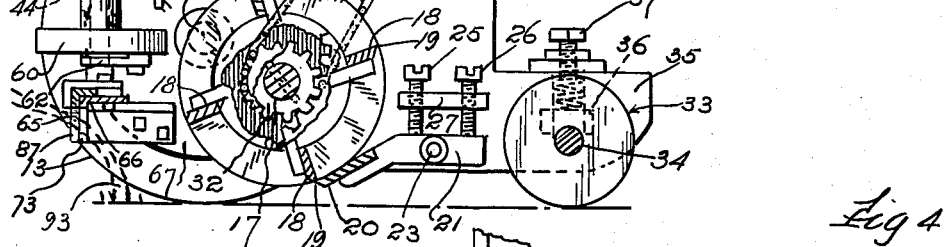
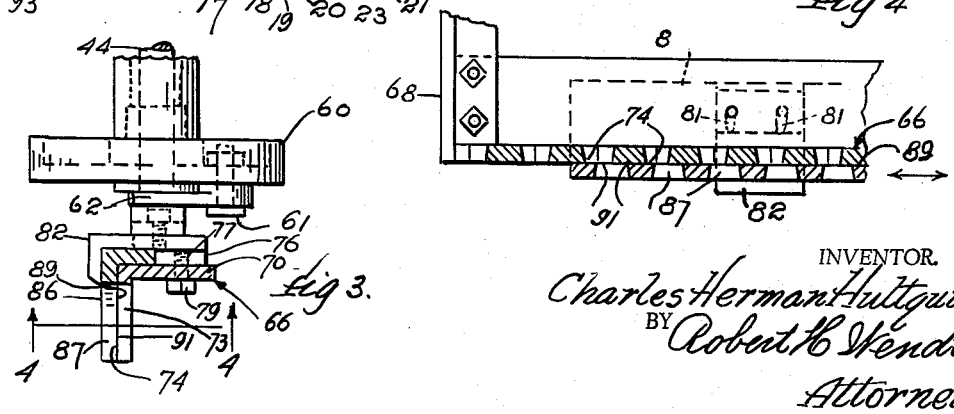
Fig. 3.  Fig. 4.
INVENTOR.
Charles Herman Hultquist,
BY Robert H. Wendt
Attorney.

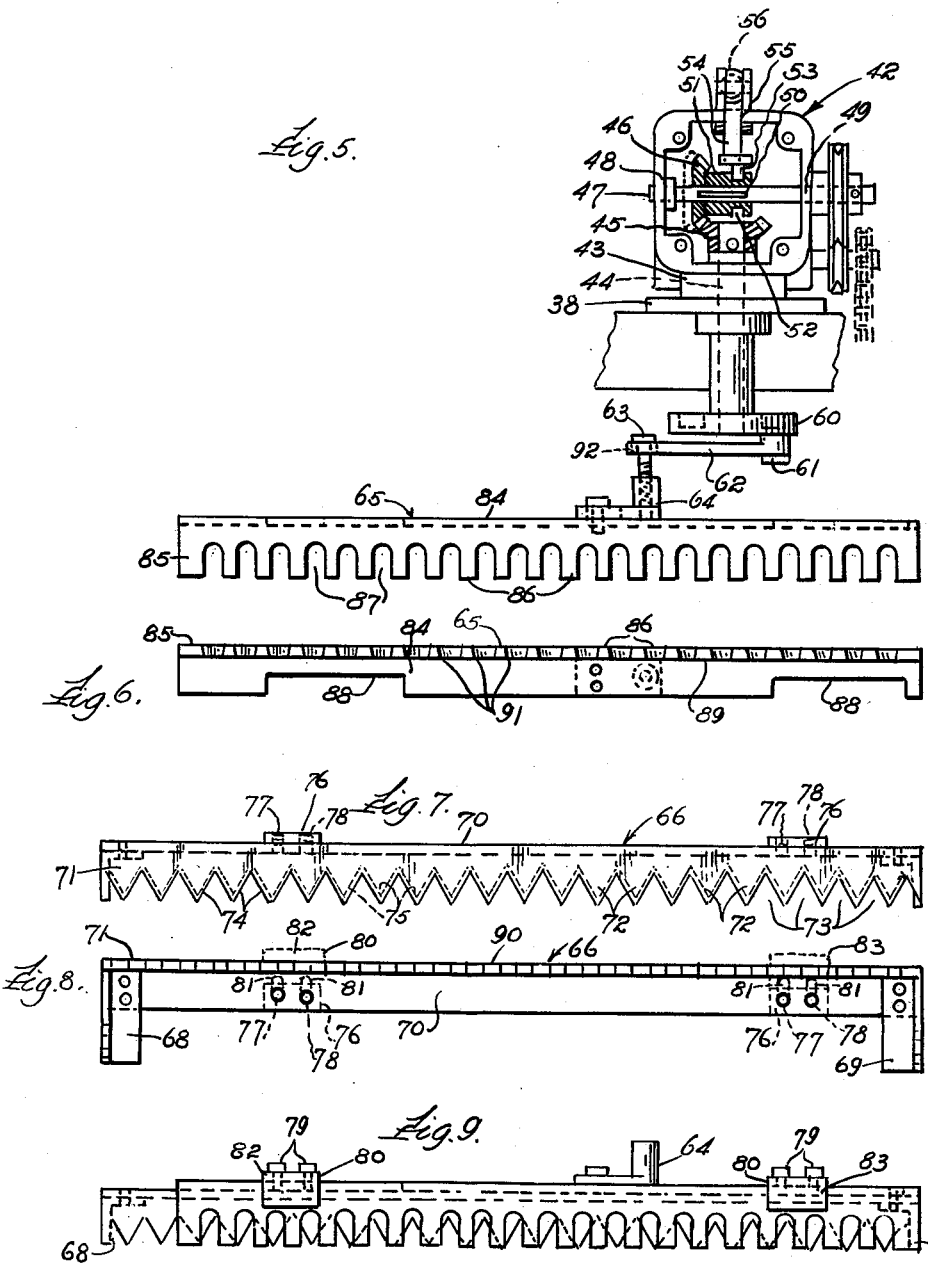

3,083,518
TALL WEED LAWN MOWER ATTACHMENT
Charles Herman Hultquist, Indian River Drive,
Jensen Beach, Fla.
Filed Aug. 1, 1961, Ser. No. 128,418
4 Claims. (Cl. 56—238)

The present invention relates to tall weed lawn mower attachments, and is particularly concerned with a lawn mower assembly for assuring the cutting of tall weeds, which cannot be cut by lawn mowers having blades rotating on a horizontal axis because the tall weeds bend over in front of the lawn mower.

The most satisfactory type of lawn mower for maintaining a closely cut lawn is a mower having blades rotating on a horizontal axis; but tall weeds occur on many lawns, which cannot be cut by such a mower because the weeds bend over in front of the mower for the reason that the mower blades cannot pass over the top end of the weeds.

One of the objects of the present invention is the provision of a complete power driven lawn mower assembly which is adapted to cut the short grass uniformly and efficiently and at the same time cut all the tall weeds which would otherwise be left standing.

Another object of the invention is the provision of an improved attachment for cutting tall weeds simultaneously with the operation of a lawn mower for efficiently cutting the shorter grass, which attachment can be secured to an ordinary power driven lawn mower with its tall weed cutting blades in advance of the cutting blades of the ordinary power driven lawn mower to be driven by the same internal combustion engine or motor.

Another object of the invention is the provision of an improved lawn mower assembly in which the cutting blades are provided with depending or downwardly extending teeth so located, just above the ground, that tall weeds are bent forwardly and forced into the spaces between the depending teeth by the root action, which tends to bend the tall weeds upward, the upward force on the forwardly bent weeds urging the weeds into the tooth spaces and presenting the tightly curved portions of the weeds close to the ground, where they can be cut most efficiently without escaping the cutting edge, as they might do if the teeth were horizontally disposed.

Another object of the invention is the provision of a tall weed lawn mower attachment which is simple in construction, which has a minimum number of parts, which may be manufactured at a low cost, which may be connected or disconnected from the driving engine at will, and which has the cutting edges of the blades so arranged that they are self-sharpening.

Other objects and advantages of the invention will be apparent from the following description and the accompanying drawings, in which similar characters of reference indicate similar parts throughout the several views.

Referring to the two sheets of drawings accompanying this specification,

FIG. 1 is a fragmentary front elevational view of a lawn mower of the horizontal blade axis type equipped with a tall weed attachment embodying the invention;

FIG. 2 is a fragmentary side elevational view in partial section on the plane of the line 2—2 of FIG. 1, looking in the direction of the arrows;

FIG. 3 is an enlarged fragmentary sectional view taken on the same plane and showing the driving arrangement for causing the reciprocating movement of the sliding cutting bar;

FIG. 4 is a fragmentary bottom plan view of the cutting bar assembly taken on the plane of the line 4—4 of FIG. 3;

FIG. 5 is an enlarged fragmentary diagrammatic view showing the gear box for driving the tall weed attachment and the arrangement for moving the gears into and out of driving position;

FIG. 6 is a bottom plan view of the movable cutting bar;

FIG. 7 is a front elevational view of the stationary cutting bar;

FIG. 8 is a bottom view of the stationary cutting bar;

FIG. 9 is a front elevational view of the stationary cutting bar and movable cutting bar assembly.

Referring to FIG. 1, 10 indicates in its entirety the present combined lawn mower assembly, including a motor driven conventional lawn mower 11 of the type having a blade rotating about a horizontal axis and the present tall weed cutting attachment 12, which is carried by the same chassis for the purpose of cutting the short grass efficiently and the tall weeds all at the same time.

Any type of conventional lawn mower may be employed, such as those driven by hand or by an internal combustion engine or by an electric motor.

The lawn mower 11 is provided with the usual chassis having a pair of rotatable wheels 13, 14 mounted upon a shaft 15 and guided by the handle 16. The wheels 13, 14 may have internal gears (not shown) driving the cutter shaft 17 upon which the helically extending cutting blades 18 are mounted and provided with cutting edges 19 for engaging a fixed cutter bar 20 mounted on a frame 21.

The frame 21 is pivotally mounted on the mower frame 22 by pivot bolts 23; and the position of the fixed cutter 20 is adjusted by the adjusting screw bolts 25, 26 carried by lug 27 on frame 22 and engaging the fixed blade frame 21.

The internal combustion engine 28 or an electric motor, when such is used, is mounted on the mower frame 22 and provided with a driving shaft 29 having a sprocket wheel 30 engaged by sprocket chain 31, which drives the cutter blade sprocket 32 to drive the rotating blades which rotate in a direction against the fixed blade 20.

The elevation of the fixed blade 20 and the rotating blades 18 is controlled by the roller 33, which is provided with pins 34 rotating in bearings in the lugs 35 and adjustably mounted by means of a bearing block 36 engaged by adjustment screw bolt 37 mounted in the lugs 35.

The tall weed cutting attachment 12 is carried by a base plate 38 and mounted on the horizontally extending plate 39 of the frame 22 by a pair of screw bolts 40, 41.

The base plate 38 extends forwardly and provides a mounting for the gear box 42, which has a vertically extending bearing 43 for rotatably supporting the vertical shaft 44. The shaft 44 is provided at its upper end with a bevel gear 45 in the gear box 42; and the bevel gear 45 may be engaged by a driving bevel gear 46, which is slidably mounted on the horizontal shaft 47.

Shaft 47 is rotatably mounted in bearings 48, 49 in the gear box 42 and has a spline 50 slidably engaging a slot in the hub 51 of gear 46. Hub 51 has a peripheral groove 52 to be engaged by an eccentric pin 53 mounted on the end of a shaft 54 rotatably mounted in a bearing 55 in the top of the gear box.

Shaft 54 has a hand lever 56 by means of which it may be rotated and the pin 53 may be caused to move the gear 46 into and out of engagement with the bevel gear 45.

In the position shown in FIG. 5 in full lines the gear 46 is in the driving position; but the dotted line position of gear 46 shows the non-driving position.

The motor shaft 29 is also provided with a V pulley 57 engaged by a V belt 58, which also extends about a V pulley 59 carried by shaft 47.

Thus the shaft 47 is driven by the motor and may be caused to drive selectively the vertical shaft 44. At its lower end the vertical shaft 44 is provided with a flywheel 60 having a depending crank pin 61 upon which a connecting rod 62 is pivotally mounted. Connecting rod 62 extends to a pivot bolt 63, which is fixedly mounted on a bracket 64 carried by the sliding cutting bar 65.

Thus the flywheel 60 is adapted to cause the sliding cutting bar 65 to reciprocate.

The tall weed cutting assembly includes the sliding cutting bar 65 and the fixed cutting bar. The fixed cutting bar 66 is secured to the frame 22 on two circular plates 67 by means of a pair of angle brackets 68, 69, which are pivoted or bolted to the ends of the fixed cutting bar 66.

The fixed cutting bar 66 comprises an angle member having a horizontal flange 70 and a vertical blade flange 71. The vertical blade flange 71 has a multiplicity of helically spaced pointed angular teeth 72 with tooth spaces 73 between the teeth for receiving the weeds.

The cutting edges 74 of the teeth 72 are formed on the front face of the angle bar vertical flange 71; and the cutting edges are formed by a bevel indicated by a dotted line 75 in FIG. 7.

The fixed cutting bar 66 has its horizontal flanges 70 provided with a pair of guide blocks 76. The guide blocks each have a pair of threaded bores 77, 78 for receiving the screw bolts 79, which adjustably mount the angle brackets 80 on the fixed cutting bar for engaging the sliding cutting bar and holding it against the fixed cutting bar.

The angle brackets 80 have elongated slots 81 receiving the screw bolts 79 whereby the positions of the vertical flanges 82 may be adjusted by means of the slots in the horizontal flanges 83.

The sliding cutting bar 65 is also of angular form, having a horizontal flange 84 and a vertical flange 85; and the vertical flange is provided with a multiplicity of vertical teeth 86 separated by tooth spaces 87.

The horizontal flange 84 is provided with a pair of elongated cutouts 88 providing space around the guide blocks 76 on the fixed cutting bar so that sliding motion is permitted for the sliding cutting bar on the fixed cutting bar.

The spacing of the teeth 86 and the tooth spaces 87 on the sliding cutting bar are preferably different from the teeth and the tooth spaces on the fixed cutting bar so that the cutting edges engage each other successively, providing a continuous and uniform resistance to the motion of the sliding cutting bar.

The teeth 86 on the sliding cutting bar are beveled in such manner that the cutting edges of the teeth 86 are on the rear face 89 of the vertical flange 85, which rear face 89 engages the front face 90 on the fixed cutting bar. Thus the cutting edges on the blades 86 are indicated at 91 on both sides of the tooth spaces 87 of the movable cutting bar. As illustrated in FIG. 3 in cross section, the cutting edges 74 and 91 are in engagement with each other.

The connecting rod 62 is preferably provided with a rubber bushing 92 surrounding the pivot bolt 63 for reducing the shock caused by reversal of motion of the cutting bar.

The operation of the lawn mower with the horizontally mounted cutters is the same as in the prior art; but the tall weed cutting attachment causes the tall weeds to bend forwardly, as indicated at 93 in FIG. 2; and the stiffness of the tall weeds tends to press them up into the tooth spaces 87 and 73.

When bent to this position, the tall weeds are so stiff that the cutting edges do not cam the tall weeds away from the cutting edges; but, on the contrary, they cut the tall weeds close enough to the ground so that the tall weeds are also cut by the rotating blades 18 of the conventional lawn mower. Thus all the vegetation on the lawn is cut to the same level cleanly and uniformly.

It will thus be observed that I have invented a tall weed cutting attachment which may be applied to conventional lawn mowers of the type having blades rotating on a horizontal axis. A lawn mower so equipped requires only a single passing of the lawn mower over the lawn and does not leave the tall weeds standing, as the conventional lawn mowers do.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A lawn mower assembly comprising a power driving member, a cutting assembly comprising a horizontal fixed blade and a cutting assembly of movable blades rotating on a horizontal axis and cooperating with the fixed blade to cut grass which is short enough to come under the blades rotating on a horizontal axis, said rotating blades being driven by said driving member, a second blade assembly located in advance of the rotating blades and having a horizontal body and a plurality of downwardly extending teeth for cutting long vegetation comprising a fixed cutter blade having downwardly extending teeth and tooth openings between the teeth adapted to receive the long vegetation which is engaged and bent over by said second blade assembly and a movable blade having downwardly extending teeth with cutting edges on the latter teeth and tooth spaces open downwardly for cutting the long vegetation which is bent forward toward a horizontal position and cut by the downwardly extending teeth on said second blade assembly.

2. A lawn mower assembly according to claim 1, in which the fixed downwardly extending teeth and the movable downwardly extending teeth are arranged with different spacing of the fixed and movable teeth to effect cutting at different times in the relative movement of the depending teeth with a minimum amount of power.

3. A mower assembly for cutting long weeds close to the ground, comprising an attachment to be mounted in advance of the moving horizontally rotating blades of a lawn mower including a base plate to be mounted on a wheeled chassis of a lawn mower, said base plate supporting a horizontally stationary cutting bar extending transversely to the forward movement of the chassis and having vertically and downwardly extending fixed teeth presenting openings for receiving the stalks of weeds close to the ground, said stationary cutting bar bending the long weeds over forwardly as the chassis moves forward, the weeds presenting curve bent portions against the stationary cutting bar between the vertical teeth thereof, and a movable cutting bar having vertically extending teeth with downwardly open tooth openings, slidably engaging the stationary cutting bar at the teeth thereof to cut the long weeds at the bent portions thereof.

4. A long weed lawn mower comprising a chassis having wheels carried by a frame, a stationary cutting bar having a horizontal body and vertical downwardly extending teeth provided with cutting edges, a movable cutting bar having a horizontal body slidably mounted on said stationary cutting bar, said movable cutting bar having a plurality of vertical downwardly extending teeth provided with cutting edges located adjacent the cutting edges of the stationary cutting bar teeth, and means for causing the movable cutting bar to reciprocate slidably on the stationary cutting bar, the two cutting bars having openings between their teeth for receiving the stalks of long weeds close to the ground and bending the long weeds over forwardly as the cutting bar is moved forward and the cutting bar is cutting the weeds while they are bent forward at a point close to the ground.

References Cited in the file of this patent

UNITED STATES PATENTS

| | | |
|---|---|---|
| 2,476,190 | Haefner | July 12, 1949 |
| 2,782,586 | Specht | Feb. 26, 1957 |